Figure 8:
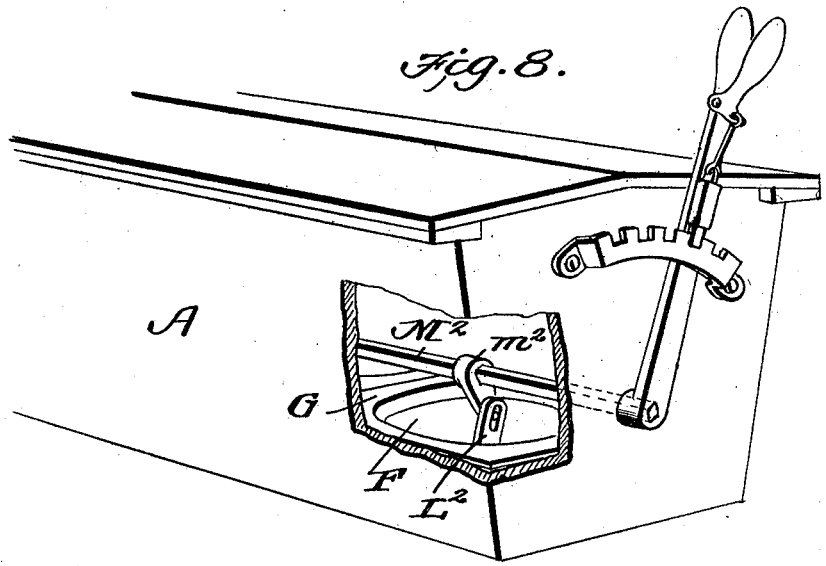

No. 693,527. Patented Feb. 18, 1902.
C. W. LOVE.
DRILL AND FERTILIZER DISTRIBUTER.
(Application filed July 15, 1901.)
(No Model.) 2 Sheets—Sheet 1.
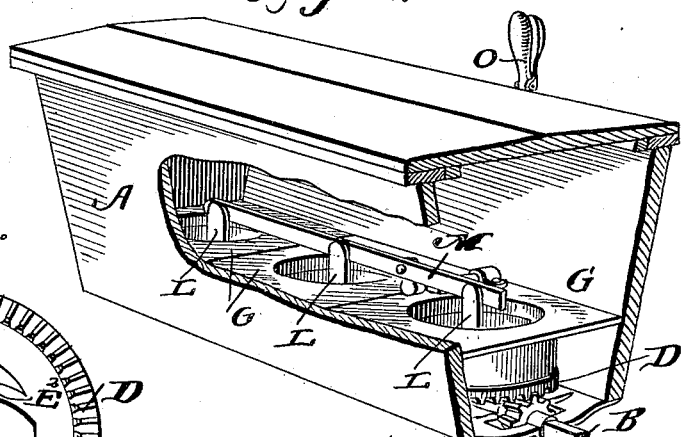
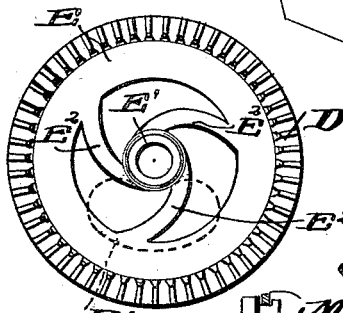
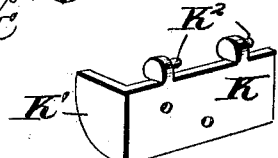
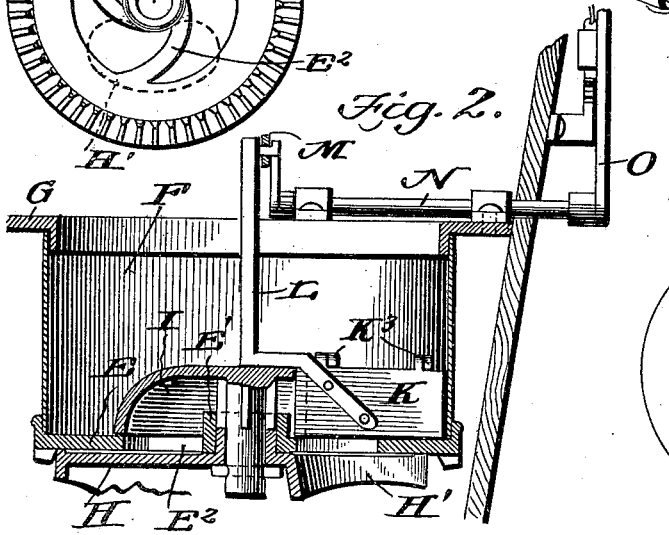
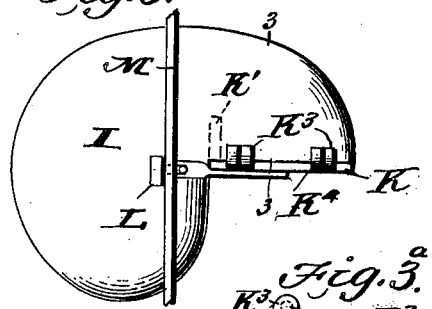
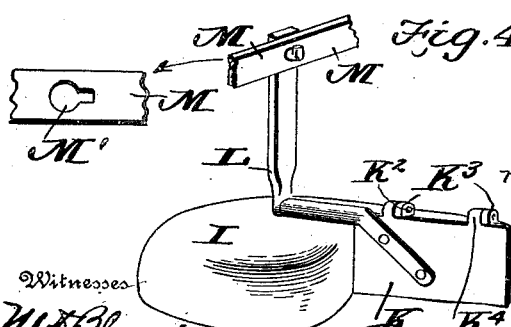
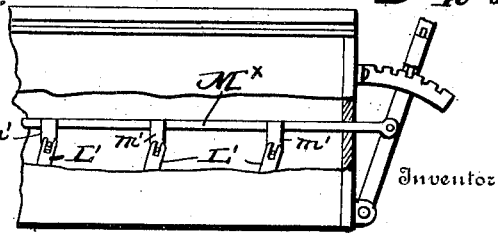
Witnesses
Inventor
Charles W. Love.
By O'Meara & Co.
Attorneys
THE NORRIS PETERS CO., PHOTO-LITHO., WASHINGTON, D. C.

No. 693,527. Patented Feb. 18, 1902.
C. W. LOVE.
DRILL AND FERTILIZER DISTRIBUTER.
(Application filed July 15, 1901.)
(No Model.) 2 Sheets—Sheet 2.

Inventor
Charles W. Love.

Witnesses

UNITED STATES PATENT OFFICE.

CHARLES W. LOVE, OF NEW ATHENS, OHIO.

DRILL AND FERTILIZER-DISTRIBUTER.

SPECIFICATION forming part of Letters Patent No. 693,527, dated February 18, 1902.

Application filed July 15, 1901. Serial No. 68,449. (No model.)

*To all whom it may concern:*

Be it known that I, CHARLES W. LOVE, a citizen of the United States, residing at New Athens, in the county of Harrison and State of Ohio, have invented a new and useful Drill and Fertilizer-Distributer, of which the following is a specification.

This invention relates generally to fertilizer-distributers, and more particularly to an improved feed mechanism whereby the amount or quantity of fertilizer to be fed to the delivery tube or chute can be regulated with great accuracy or exactness.

Another object of the invention is to provide a feed mechanism which can be used in connection with a fertilizer-distributer or grain-drill; and a still further object is to provide a feed mechanism by means of which the supply cannot only be quickly and easily regulated, but entirely cut off whenever desired.

In the class of fertilizer-distributers to which mine especially relates the feeding of the fertilizer to the delivery tube or chute is accomplished by rotating a hopper over a perforated bed-plate, a stationary cap or shell being arranged within the hopper and adapted to cover the opening in the bed-plate. In a fertilizer-distributer constructed in this manner it becomes necessary to change the stationary caps or shells whenever it is desired to regulate the amount or quantity of fertilizer to be fed. This not only requires the expenditure of considerable time and labor, but also necessitates the employment of a series of different-sized caps or shells. The object of my invention, therefore, is to remedy these defects and provide a cap or shell which can be quickly and easily adjusted for the purpose of regulating the discharge of the fertilizer and avoiding the necessity of removing the cap or shell from the hopper.

With these various objects in view the invention consists, essentially, in providing a cap or shell with a hinged door or plate and connecting suitable operating devices to the said door or plate whereby it can be opened or closed to any desired extent, thereby regulating the amount of fertilizer discharged through the apertured bed-plate.

The invention consists also in the improved construction of the rotary hopper-bottom, whereby a continuous and even feed is obtained.

The invention consists also in certain details of construction and novelties of combination, all of which will be fully described hereinafter and pointed out in the claims.

Figure 9:
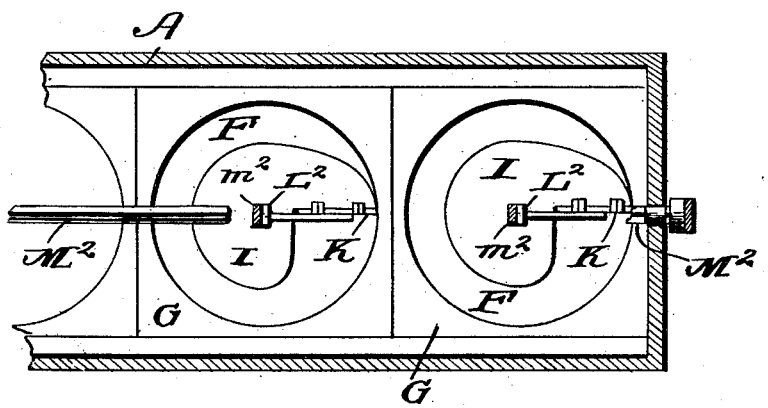

In the drawings forming part of this specification, Figure 1 is a sectional perspective view illustrating a fertilizer-distributer casing provided with hoppers having caps or shells constructed in accordance with my invention and connected by means of a common operating-rod. Fig. 2 is a vertical sectional view of the hopper, bed-plate, and cap or shell, the regulating mechanism being shown in elevation. Fig. 3 is a top plan view of the stationary cap or shell. Fig. 3ᵃ is a section on the line 3 3 of Fig. 3. Fig. 4 is a perspective view showing the hinged door and lever attached thereto. Fig. 5 is a detail perspective view of the door. Fig. 6 is an inverted plan view of the hopper-bottom, and Figs. 7, 8, and 9 show slightly-modified forms of operating mechanism.

Referring to the drawings, A indicates the usual box or casing, having the rotary shaft B journaled longitudinally therein, said shaft carrying a series of pinions C, which mesh with the teeth D, arranged upon the bottom E of the hopper-cup F, said hopper rotating within the box or casing, the top thereof working in a plate G, having a circular aperture through which the fertilizer is fed to the hopper. The hopper F rotates upon a stationary bed-plate H, having a discharge-opening H', from which leads the delivery tube or chute.

The hopper-bottom E has the hub E' and a series of curved arms E², extending from said hub to the rim of the bottom, as most clearly shown, thereby providing a series of openings having curved sides and gradually tapering, as most clearly shown in Fig. 6. As before stated, the hopper rotates upon the stationary bed-plate, carrying with it the fertilizer contained within the said hopper and feeding the fertilizer through the openings of the hopper-bottom out through the aperture of the bed-plate.

Heretofore the arms connecting the hub and rim of the hopper-bottom have been made straight or on radial lines and the fertilizer was fed to the opening in the bed-plate intermittently; but by having the arms curved, as shown in Fig. 6, a continuous feed is maintained, as it will be readily seen that portions of two openings can be feeding to the opening H' at one and the same time. In this class of fertilizer-distributers a cap or shell I is arranged within the hopper for the purpose of regulating the amount of fertilizer fed through the discharge-opening H'. The cap I which I employ is of peculiar construction, being essentially in the form of three-fourths of a circle and having a door or plate K, hinged to the open side thereof. This door or plate K is formed with a flange K' at its inner end, and at its upper edge the plate is formed with pintles K², which are adapted to engage ears K³, formed upon the cap or shell I, thereby pivotally connecting the door or plate to the cap or shell. It will be noted that the pintles K² are arranged upon the outer sides of lugs K⁴, and as the inner end of the door or plate bears against the side of the cap or shell it will be impossible for the door or plate to become disconnected after it has once been properly fixed and turned down.

An elbow-lever L is rigidly attached at one end to the outer face of the door or plate K, the upper end of said lever being pivotally connected to an operating-rod M, so that when the said rod is moved horizontally to one side or the other the elbow-lever L is rocked and the door or plate K is opened or closed, thereby permitting the fertilizer to pass thereunder to the feed-opening H'. Inasmuch as a series of hoppers are arranged within a single case or box, it is of course necessary to operate all of the feed mechanisms simultaneously, and this I accomplish by connecting all of the elbow-levers L to the operating-rod M, which rod M is in turn operated by a shaft N and operating-rod O. In practice I prefer to form the operating-rod with a series of keyhole-slots M' and also to affix headed pins and slots to the upper end of the elbow-lever L. By this means the levers and rod can be quickly and easily coupled, thereby avoiding the use of screws or other fastening devices, which are liable to work loose.

In Fig. 7 I have shown a slight modification in which the ends of the levers L' are slotted to engage pins arranged upon arms $m'$, carried by the operating-rod M<sup>×</sup>, and in Figs. 8 and 9 I show a further modification in which a rotary shaft M² is employed, and in this case the shaft also has depending arms $m^2$, carrying pins that are adapted to work in slots formed in the upper ends of the elbow-levers L². The operation, however, in all the forms is identical, and it will of course be understood that certain other changes may be made without departing from the broad principles of my invention.

In operation the regulating door or plate is under the direct control of the operator through the medium of the hand-lever O, rock-shaft N, operating-rod M, and elbow-levers L, and it will readily be understood that the said door or plate can be raised for the purpose of permitting a greater quantity of the fertilizer to be fed through the opening H' or closed to feed a lesser quantity, and in case it should be necessary to cut off the discharge entirely the door can be instantly closed, thereby preventing any loss of material. By having the regulation of the feed directly under the control of the operator during the movement of the machine the said operator is enabled to deposit a greater or less quantity of fertilizer at any point desired, as it frequently happens that certain portions of a field require more or less fertilizer than other portions, and heretofore the regulation of the feed of the fertilizer during the operation of the machine has not been altogether satisfactory; but by means of the cap or shell herein shown and described the operator is enabled to regulate the feed with accuracy without stopping the machine for the purpose of making the adjustment.

Having thus fully described my invention, what I claim as new, and desire to secure by Letters Patent, is—

1. In a fertilizer-distributer, a rotary hopper having a bottom formed with a series of openings, said openings having curved sides and gradually tapering, the narrow end of one opening being adjacent to the broad end of the next adjacent opening, substantially as and for the purpose described.

2. In a fertilizer-distributer, the combination with a rotary hopper, of a stationary cap located within the hopper, and a hinged plate attached to the said cap whereby the amount of material fed from the hopper can be regulated.

3. In a device of the kind described, the combination with a rotary hopper, of a stationary cap having a door hinged thereto, said door or plate being adjustable for the purpose of regulating the amount of material fed through the hopper-bottom.

4. In a device of the kind described, the combination with a stationary bed-plate apertured as described, of a hopper rotating upon said bed-plate and having openings in the bottom, a stationary cap arranged within the hopper, a door hinged to the said cap or shell and provided with means for adjusting the same whereby the amount of material fed from the hopper through the apertured bed-plate can be regulated.

5. In a device of the kind described, the combination with the apertured bed-plate, of the rotary hopper having openings in the bottom, the stationary cap arranged within the hopper, the hinged door connected to the said cap or shell, the elbow-lever and operating-rod attached thereto, substantially as shown and described.

6. In a device of the kind described, the combination with the apertured bed-plate, of the rotary hopper arranged thereon and having openings in the bottom, a stationary cap arranged within the hopper, a door hinged to the open side of said stationary cap or shell, the elbow-lever connected to the said door or plate, the operating-rod, the rock-shaft and operating-lever, all arranged and adapted to operate substantially as shown and described.

CHARLES W. LOVE.

Witnesses:
  J. B. WILLIAMS,
  DAVID McCALL.